United States Patent [19]

Vernese

[11] Patent Number: 5,769,478
[45] Date of Patent: Jun. 23, 1998

[54] TRAILER AND COMPONENT ASSEMBLY METHOD

[76] Inventor: Michael P. Vernese, 11391 Manatee Ter., Lake Worth, Fla. 33467

[21] Appl. No.: 410,699

[22] Filed: Mar. 27, 1995

[51] Int. Cl.$^6$ .................................................. B60P 3/04
[52] U.S. Cl. ......................................... 296/24.2; 296/181
[58] Field of Search .................................... 296/181, 24.2

[56] References Cited

U.S. PATENT DOCUMENTS

| | | |
|---|---|---|
| D. 342,700 | 12/1993 | Vernese . |
| 2,569,965 | 10/1951 | Wideman . |
| 2,753,018 | 7/1956 | Curell . |
| 2,839,327 | 6/1958 | Simpkins . |
| 2,991,116 | 7/1961 | Andrews . |
| 3,003,810 | 10/1961 | Kloote et al. . |
| 3,053,224 | 9/1962 | Pierce ..................................... 296/24.2 |
| 3,156,503 | 11/1964 | Chieger . |
| 3,266,837 | 8/1966 | Stricker, Jr. et al. . |
| 3,380,216 | 4/1968 | Spence . |
| 3,760,548 | 9/1973 | Sauer et al. . |
| 3,886,705 | 6/1975 | Cornland . |
| 4,018,480 | 4/1977 | Stone . |
| 4,043,583 | 8/1977 | Tidwell, Jr. . |
| 4,168,933 | 9/1979 | Kane ..................................... 296/24.2 |
| 4,222,606 | 9/1980 | Brown et al. . |
| 4,468,061 | 8/1984 | Blake ..................................... 296/181 |
| 4,498,264 | 2/1985 | McCafferty et al. . |
| 4,613,182 | 9/1986 | Stone . |
| 4,647,101 | 3/1987 | Ruggeri . |
| 4,685,720 | 8/1987 | Oren et al. .............................. 296/181 |
| 4,951,992 | 8/1990 | Hockney ................................. 296/181 |
| 5,052,741 | 10/1991 | Brown et al. . |
| 5,267,515 | 12/1993 | Tsuruda et al. . |
| 5,403,063 | 4/1995 | Sjostedt et al. ......................... 296/181 |
| 5,509,714 | 4/1996 | Schmidt ................................. 296/181 |
| 5,526,622 | 6/1996 | Augustine ............................. 52/309.9 |
| 5,588,693 | 12/1996 | Higginson et al. .................... 296/183 |

FOREIGN PATENT DOCUMENTS

| | | | |
|---|---|---|---|
| 309358 | 3/1989 | European Pat. Off. ............... | 296/181 |

OTHER PUBLICATIONS

"Horse Transportation Catalog," Sooner Mfg. Co., Duncan, Oklahoma, Dec. 1992.

*Primary Examiner*—Gary C. Hoge
*Attorney, Agent, or Firm*—Litman, McMahon & Brown, LLC

[57] ABSTRACT

A trailer includes a chassis having a frame, axles, wheels, and a floor. The frame includes side rails and a tongue assembly. A superstructure is mounted on the frame and includes front, back and opposite side walls. A roof is mounted on top of the side walls. The superstructure components are connected by T-fasteners and are mounted on the frame thereby. A method of assembling a trailer from components includes the steps of providing a frame, mounting side walls on the frame, connecting the side walls and mounting a roof thereon.

1 Claim, 3 Drawing Sheets

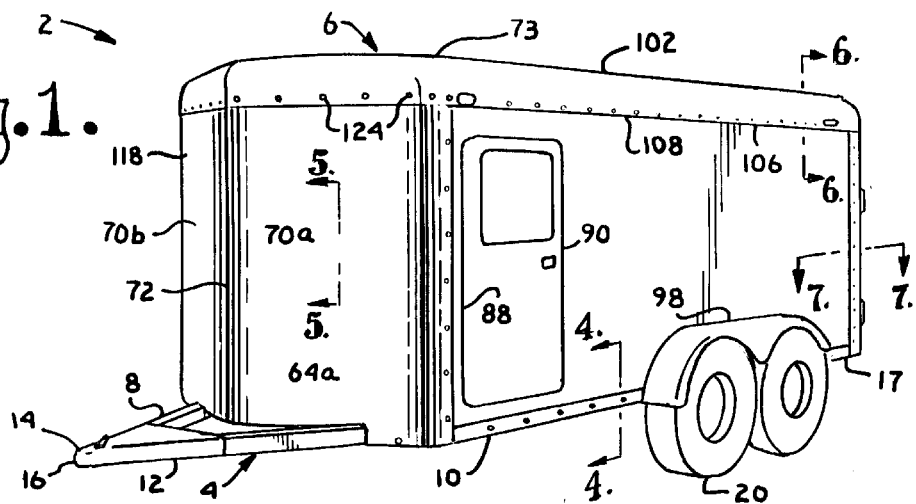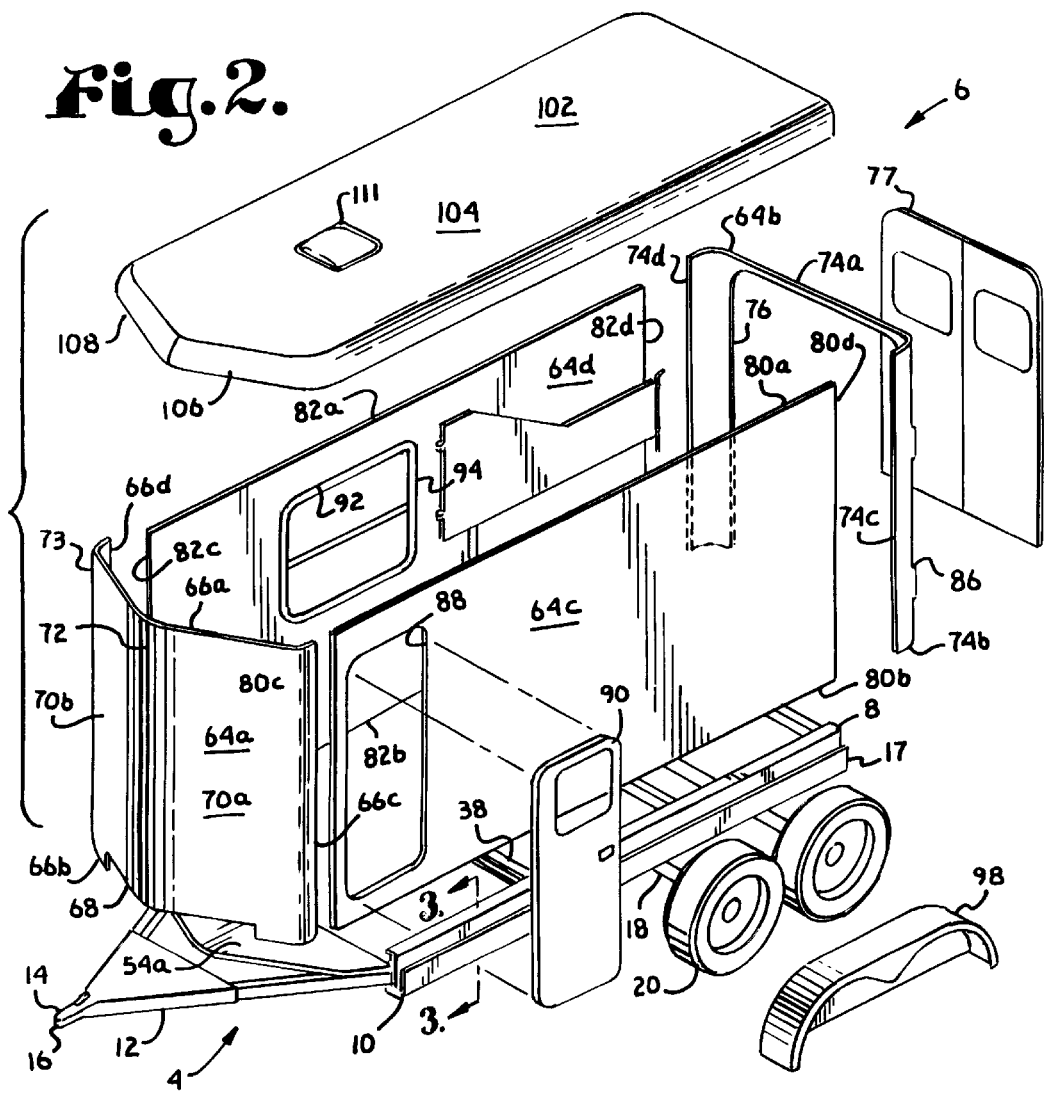

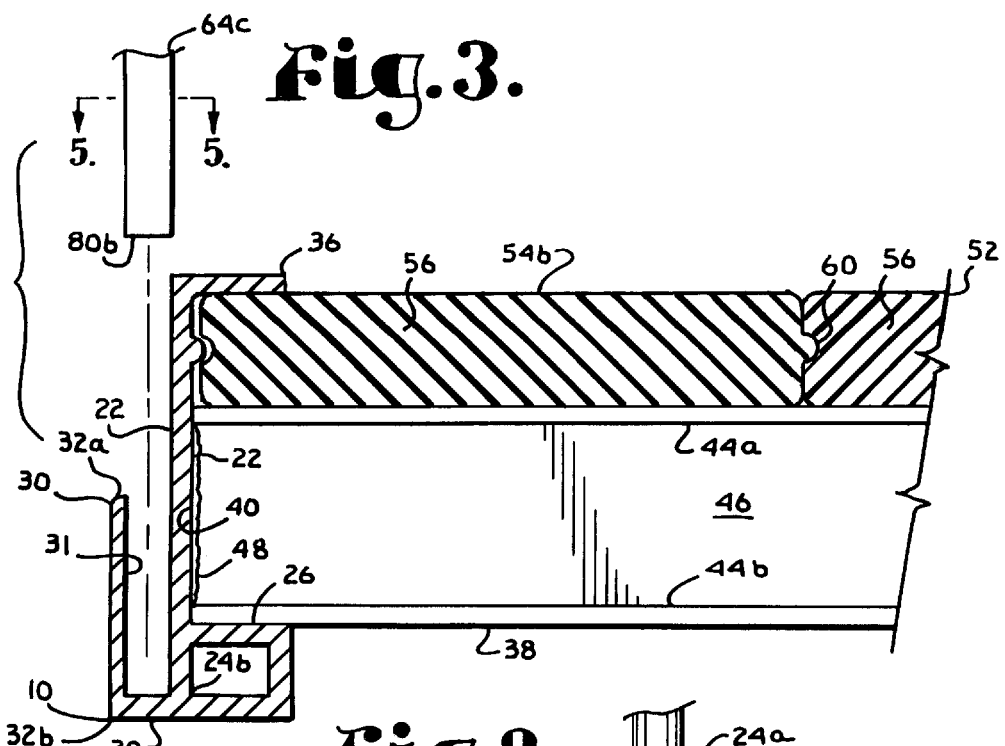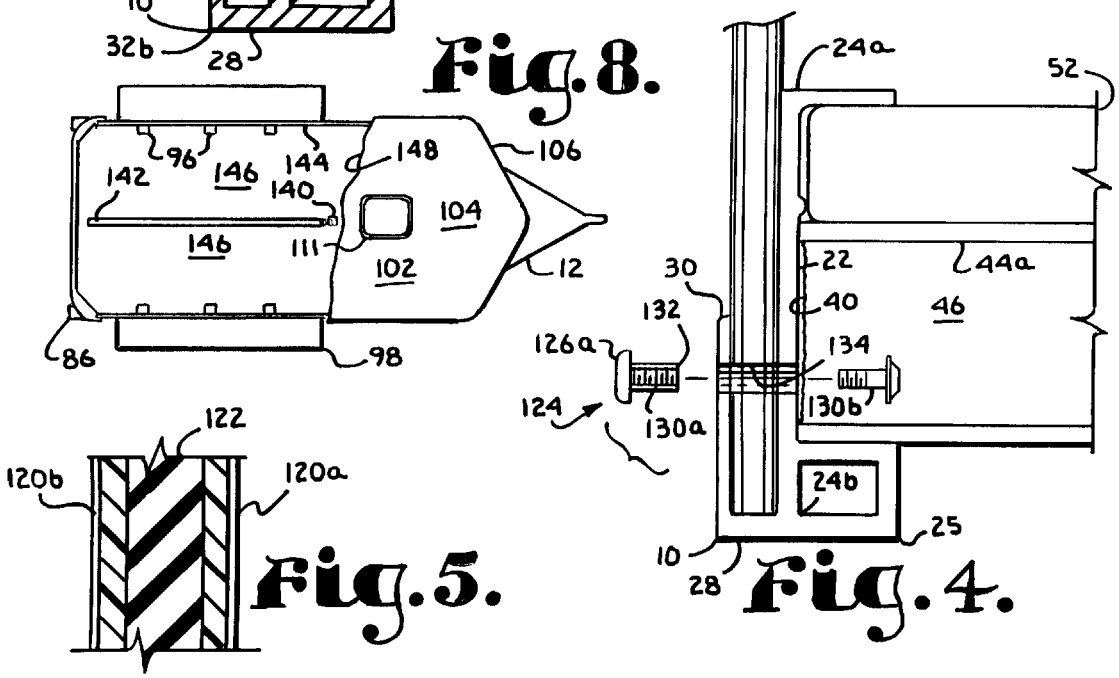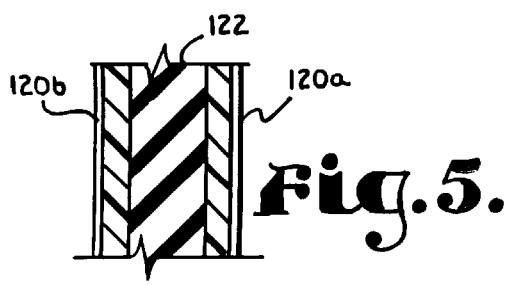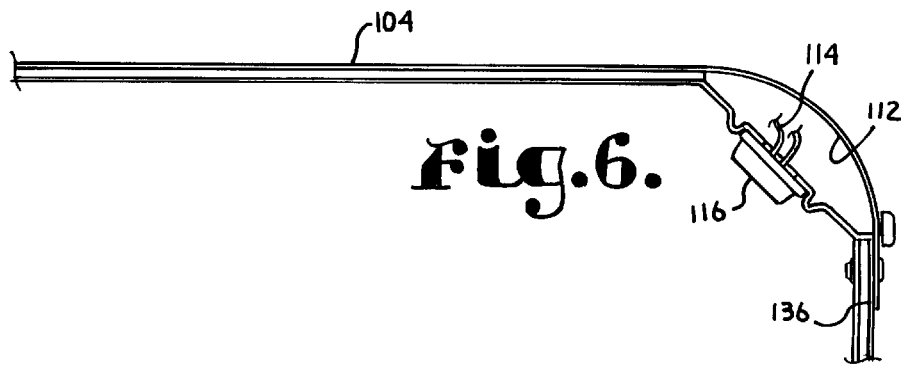

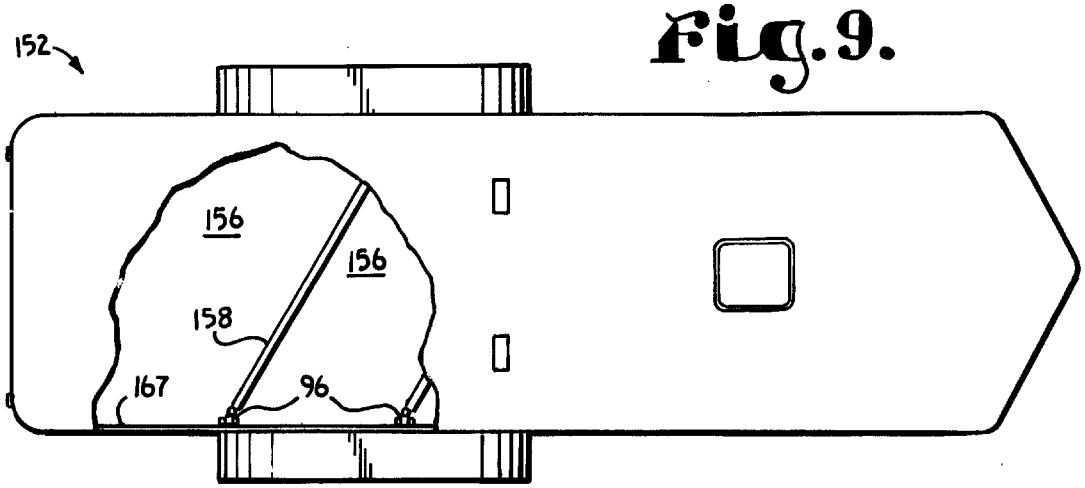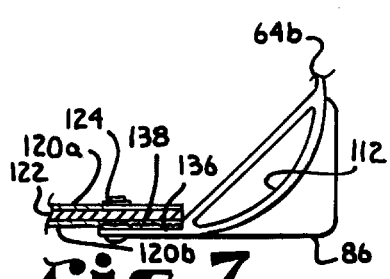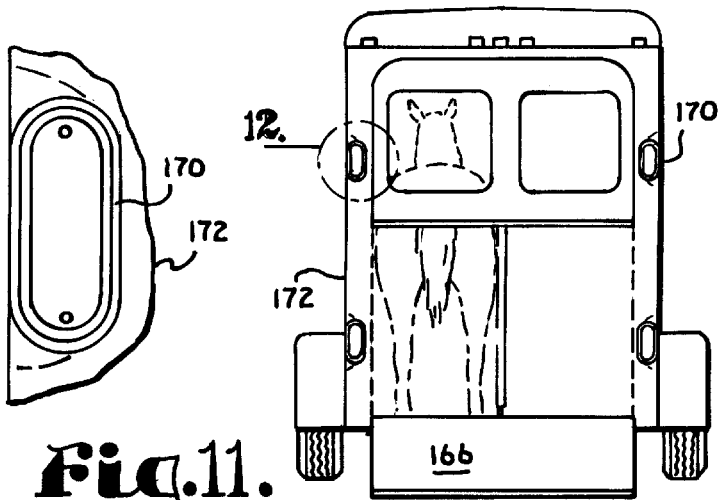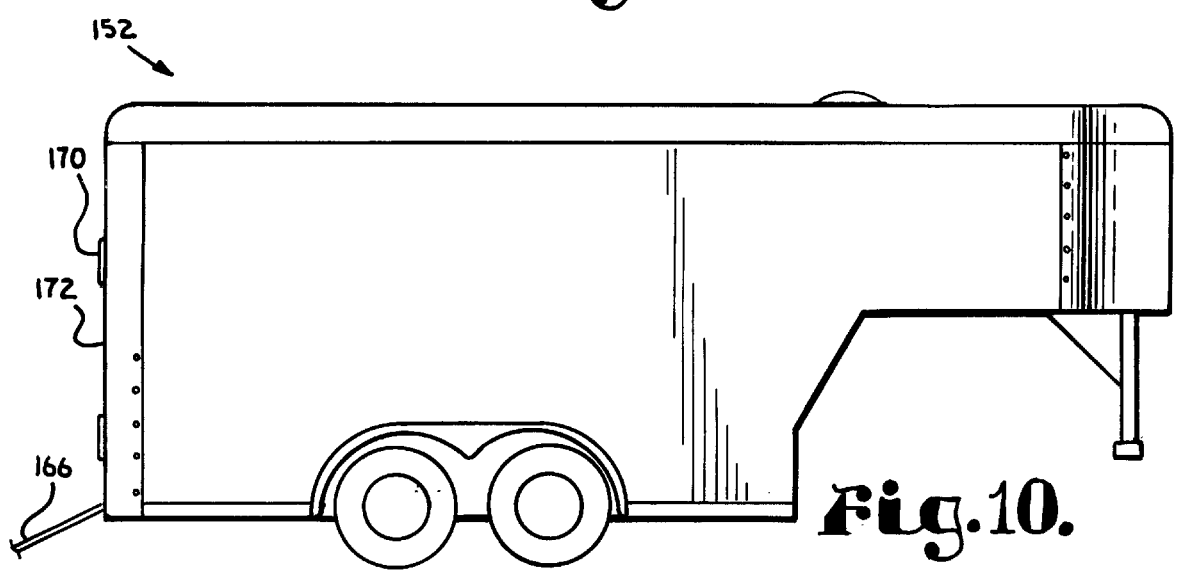

TRAILER AND COMPONENT ASSEMBLY METHOD

BACKGROUND OF THE INVENTION

1. Field of the Invention

The present invention relates generally to trailers, and in particular to a trailer with standardized components and an assembly method therefor.

2. Description of the Related Art

Trailers comprise a class of vehicles which are generally adapted for transporting loads of various kinds. A wide variety of different trailer configurations have heretofore been provided for meeting the requirements of particular applications.

For example, general purpose cargo trailers can be enclosed, open or flat-bed in configuration. Special purpose trailers have also been provided for hauling cargo such as livestock. A common type of livestock trailer is adapted for transporting horses. Horse trailers are relatively common among ranchers, breeders and others who own horses, since they often require transportation to and from shows, races, veterinarians, markets and other destinations which require that they be transported over public roads.

Horse trailers are available in various sizes and configurations. Typical variable factors include the number of horses to be transported and the weight of the trailer, which can relate to the towing capacity of a tow vehicle.

Large quantities of the available trailers, including significant numbers of horse trailers, are often sold on the basis of custom orders unless the customer purchases a trailer from the dealer's inventory of same. Another disadvantage of a diverse product line such as trailers relates to the expense of producing small quantities of a wide variety of different designs. Substantial tooling and set-up charges are often encountered by trailer manufacturers which costs can often be recovered from only a relatively small number of sales. The prices of individual trailer units must therefore be increased accordingly to recover such costs. Mass production techniques for other vehicles, such as automobiles, could likewise benefit the trailer industry if the components thereof could be standardized as much as possible.

Another important design consideration affecting trailer manufacturers relates to the necessity of providing resistance against the elements. Trailers in general, and livestock trailers in particular, are often subject to heavy usage under severe environmental conditions. They are often stored out-of-doors in uncovered conditions and are subjected to precipitation and road debris such as sand, gravel, rock salt, etc. Moreover, in coastal areas the corrosive effects of salt spray can damage trailers constructed of steel and reduce their useful lives. Moreover, the degrading effects of solar insolation, particularly in the ultraviolet range, can dull finishes and compromise the appearance of painted trailers.

The present invention addresses some of the problems with previous trailers noted above and the considerations effecting their designs.

SUMMARY OF THE INVENTION

In the practice of the present invention a trailer is provided which includes a chassis having a frame, axles, wheels and a floor. The frame includes side rails which form upwardly-open channels. A superstructure includes front, back and opposite side walls or panels with multi-layer composite constructions including inner and outer fiber reinforced plastic layers with a PVC core sandwiched therebetween. The back and side walls or panels include door and window openings and are mounted on the side rails by placing lower edges thereof in the side rail channels. The panels are adapted for mechanically fastening to each other by suitable T-bolt fasteners. A roof is placed on top of the panels and includes a rim which overhangs upper edges of the panels. The superstructure encloses a trailer interior which can be subdivided into compartments by partitions extending within the superstructure interior in either straight or slanted orientations for defining livestock stalls. A method of manufacturing a trailer includes the steps of providing a frame, mounting axles and wheels on the frame, placing a floor structure on the frame, providing side rails with upwardly-open channels, mounting side walls on the frame by placing lower edges thereof in the side rail channels; mounting front and back walls on the frame and connecting same to the side walls, and mounting a roof on upper edges of the walls.

OBJECTS AND ADVANTAGES OF THE INVENTION

The principal objects and advantages of the present invention include: providing a trailer with component construction; providing such a trailer which can be assembled in a variety of configurations; providing such trailer which can be assembled from standardized components; providing such a trailer which can be assembled in various configurations from such standardized components; providing such a trailer which is relatively resistant to the effects of weather and corrosion; providing such a trailer which is relatively cool in operation; providing such a trailer which can be adapted for loading horses in various orientations; and providing such a trailer which is economical to manufacture, efficient in operation and particularly adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE INVENTION

FIG. 1 is a front, side perspective view of a trailer embodying the present invention.

FIG. 2 is an upper, front, side exploded perspective view of the trailer showing the assembly of components thereof.

FIG. 3 is an enlarged, fragmentary, vertical, cross-sectional view taken generally along line 3—3 in FIG. 2.

FIG. 4 is an enlarged, fragmentary, vertical, cross-sectional view of the trailer taken generally along line 4—4 in FIG. 1 and particularly showing the construction of a floor structure.

FIG. 5 is an enlarged, fragmentary, cross-sectional view of the trailer, taken generally along line 5—5 in FIG. 1 and particularly showing the composite construction of a wall thereof.

FIG. 6 is an enlarged, fragmentary, vertical, cross-sectional view of the trailer, taken generally along line 6—6 and particularly showing the connection of a roof to a wall upper edge.

FIG. 7 is an enlarged, horizontal, cross-sectional view of the trailer taken generally along line 7—7 in FIG. 1 and particularly showing the connection of a back wall to a side wall thereof.

FIG. 8 is a top plan view with portions of the roof broken away to reveal the trailer interior.

FIG. 9 is a top plan view of a gooseneck-style trailer comprising a first modified or alternative embodiment of the present invention.

FIG. 10 is a side elevational view thereof.

FIG. 11 is a rear elevational view thereof.

FIG. 12 an enlarged, fragmentary, rear elevational view thereof taken generally within the circle shown on FIG. 11 and particularly showing a light fixture thereof.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a trailer embodying the present invention. The trailer 2 generally comprises a chassis 4 and a superstructure 6.

II. Chassis 4

The chassis 4 includes a frame 8 with first and second, opposite, parallel side rails 10 and a yoke-type tongue assembly 12 mounting a ball hitch 14 at a front end 16 of the chassis 4. The frame 8 mounts axles 18 which rotatably mount wheels 20. The side rails 10 can comprise any suitable material, such as extruded aluminum, and extend from the tongue assembly 12 to a back end 17 of the chassis 4. Each side rail 10 includes a vertical flange 22 with upper and lower ends 24a, 24b. A rectangular tubular section projects inwardly from the vertical flange lower end 24b and forms an inner shoulder 26. The tubular section 25 is enclosed at the bottom by a base plate 28.

An outer, retainer flange 30 extends upwardly from the base plate 28 in generally parallel, spaced relation outwardly from the vertical flange 22 and terminates at an upper, free edge 32a at a level between the levels of the vertical flange ends 24a, 24b. A ridge 34 projects inwardly from the vertical flange 22 in spaced relation above the tubular section 25. A retainer trim piece 36 projects inwardly from the vertical flange upper edge 32a in spaced relation above the ridge 34.

A plurality of frame cross pieces 38 extend transversely across the frame 8 and include opposite ends 40 each mounted on a respective vertical flange 22 between the tubular section 25 and the ridge 34. Each cross piece 38 has the general configuration of an I-beam with upper and lower cross piece flanges 44a, 44b interconnected by a cross piece web 46. The cross pieces 38 can be connected to the vertical flanges 22 by weldments 48.

A floor structure 52 includes front and back portions 54a, 54b. The floor structure back portion 54b is formed by mounting floor members 56 over the cross pieces 38, the latter of which can be spaced at intervals of approximately thirteen inches on centers with the floor members 56 spanning longitudinally across the cross pieces 38. Each floor member 56 includes a first side edge 58a forming a tongue 60 and a second side edge 58b forming a groove 62 adapted to receive the tongue 60 of a respective adjacent juxtaposed floor member 56. The floor members 56 adjacent the side rails 10 extend slightly under the retainer trim pieces 36.

III. Superstructure 6

The superstructure 6 includes front, back, first side and second side walls or panels 64a–64d.

The front wall 64a has upper, lower and opposite side edges 66a–66d and a notch 68 at its lower edge 66b for receiving the tongue assembly 12. The front wall 64a includes first and second panels 70a, 70b which converge in a forward direction to a vertical, rounded leading edge 72. The front wall 64a includes rounded corners 73 adjacent the front wall side edges 66c, 66d.

The back wall 64b includes upper, lower and opposite side edges 74a–74d and a back door opening 76. The back wall 64b includes rounded corners 78 in proximity to the front wall side edges 66c, 66d. A pair of back doors 77 are mounted on the back wall 64b and are movable between open and closed positions with respect to the opening 76 therein.

The back wall 64b includes a plurality of light fixture receivers 84 located adjacent to the back door opening 76 each receiving a respective light fixture 86 for providing the necessary rear signal, brake and running lights for the trailer 2 for compliance with U.S. Department of Transportation requirements and other applicable vehicle safety standards and guidelines.

The first and second side walls 64c, 64d include upper, lower, front and back edges 80a–d and 82a–d respectively. The side wall lower edges 80b, 82b are received in respective side rail channels 31. The first side wall 64c includes a side door opening 88 selectively receiving a side door 90 which is hingedly mounted on the first side wall 64c for movement between open and closed positions with respect to the side door opening 88.

The second side wall 64d includes a plurality of window openings 92 each receiving a respective side window 94 which has open and closed positions with respect to the side window opening 92. A plurality of vertical stiffeners 96 are integrally connected to each side wall 64c, 64d on an inside face thereof and can comprise suitable structural members such as tubes, channels, I-sections, angle-sections, etc. A pair of fenders 98 are mounted on the side rails 10 adjacent the side walls 64c, 64d in covering relation over the wheels 20 and may be formed of fiberglass, aluminum or some other suitable material.

A roof 102 includes a crowned top panel 104 and a rim 106 depending downwardly therefrom and terminating at a lower, free edge 108. The roof 102 includes a rounded corner edge 110, an electrical wiring passage 112 located immediately inside the corner edge 110 and a vent 111. The wiring passage 112 receives electrical wiring 114 connected to running lights 116.

The walls 64a–d and the roof 102 collectively form a trailer body 118, which is adapted for relatively easy assembly from its components. Each of said body components can comprise a composite construction consisting of inner and outer fiber reinforced plastic layers 120a, 120b and an insulating foam core layer (e.g., PVC) 122 sandwiched therebetween. The inner fiber reinforced plastic layer 120a can receive a gel coat finish, and the outer fiber reinforced plastic layer 120b can receive a white, polished gel coat finish for providing ultraviolet resistance.

Connections of the body 118 components to each other, and connection of the walls 64a–d, can be accomplished by means of mechanical fasteners 124 of the type which are sometimes referred to as "T-bolts". Each fastener 124 includes an outer, female part 126a and an inner, male part 126b. The outer, female part 126a includes a head 128a with a hollow, tubular, female-threaded shank 130a extending therefrom. The outer, female part is encased in a plastic cover 132. The inner, male fastener part 126b includes a head 128b with a mounting tool receiver 129 and a male-threaded shank 130b. The mechanical fasteners 124 are mounted in suitable receivers 134 and sized to receive the outer, female part shanks 130. The mounting tool receiver 129 can be hexagonal to receive an Allen wrench, or can comprise some other suitable configuration.

A central column 140 extends from the floor structure 52 to the roof 102 and mounts on a longitudinally-extending partition 142 which divides an interior 144 of the trailer body 118 into a pair of juxtaposed stalls 146. Suitable bars and other restraint devices (not shown) can be placed in front of and behind the stalls 146 for containing horses therein.

Adjacent the front walls 64 the floor structure front portion 54a comprises a composite, multi-layered fiber reinforced plastic construction with a PVC core and is mounted in the frame tongue assembly 12. The floor structure front portion 54a is located partly within a tack/dressing area 148 of the interior 144 in front of the stalls 146. The tack/dressing area 148 is accessible through the side door 90.

IV. Method of Manufacture and Operation

The trailer 2 is adapted for assembly of its components into trailers of various configurations, utilizing a number of standardized components. Thus, trailers of different lengths can have common front and back walls 64a, 64b, common doors 77, 90, common windows 94 and common fenders 98. Other components can also be standardized. By providing different sizes of chassis 4, side walls 64c, 64d and roofs 102, trailers 2 of various lengths can be provided.

For example, a gooseneck trailer 152 comprising a first modified or alternative embodiment of the present invention is shown in FIGS. 9–12 and provides a slant loading configuration whereby horses may be transported in stalls 156 extending in angular orientations across the compartment and being separated by partitions 158 connected to respective vertical stiffeners 96. A ramp 166 is provided at the back end of the trailer 152 for selectively providing sloping access to a trailer interior 167 through a back door opening 76, which also mounts a door upper half 168. Light fixtures 170 are mounted on a back wall 172 thereon.

The components of the trailer 2 can be fabricated in suitable molds, e.g., by a process wherein the fibers are chopped and blown into the mold with resin, whereafter the molded part is stripped from the mold. The assembly method of the present invention includes the following assembly steps:

1. Construct frame 8.
2. Mount hitch 14, axles 18 and wheels 20.
3. Install rubber floor structure back portion 54b in stall area 146.
4. Install fiberglass floor structure front portion 54a in dressing/tack area 148.
5. Mount front and back walls 64a, 64b on chassis 4 by means of fasteners 124 extending through side rail flanges 22, 30 and wall lower edges 64b, 74b.
6. Install side walls 64c, 64d by placing lower edges 80b, 82b thereof in respective side rail channels 31 and securing same with mechanical fasteners 124 placed in fastener receivers 134 drilled in side rails 10 and side wall lower edges 80b, 82b and by connecting front and back wall side edges 64c, 64d and 74c, 74d to side wall front and back edges 80c, 80d and 82c, 82d with mechanical fasteners 124.
7. The roof 102 is mounted on top of the walls 64a–d with the roof rim 106 overlapping the wall upper edges 64a, 74a, 80a and 82a and secured thereto by mechanical fasteners 124.
8. At joints 136 between respective components of the trailer body 118, caulk 138 can be provided for weather sealing same. Adhesive, weather stripping or other suitable materials could be placed in the joints 136 for adhering the components of the body 118 and/or for weather sealing same.
9. The dividers/partitions 158, the columns 140, the vertical stiffeners 96, the doors 77, 90, the windows 94, the rear light fixtures 86, the running lights 116 and the fenders 98 can then be installed to finish the trailer 2.

Other finish procedures can also be employed, such as painting, applying indicia, signage, etc.

It is to be understood that while certain forms of the present invention have been illustrated and described herein, it is not to be limited to the specific forms or arrangement of parts described and shown.

What is claimed and desired to be secured by Letters Patent is as follows:

1. A trailer, which comprises:
   (a) a chassis including:
      (1) a front end;
      (2) a back end;
      (3) a frame having opposite side rails and a tongue at the chassis front end, said frame including a plurality of cross pieces extending transversely between said side rails;
      (4) an axle mounted on the frame and extending transversely with respect thereto;
      (5) a pair of wheels mounted on said axle, each said wheel being located on a respective side of said trailer; and
      (6) a floor structure comprising a plurality of juxtaposed tongue-and-groove floor members extending generally longitudinally and overlaying said cross pieces, said floor having a first, rear portion with said tongue-and-groove floor members and a front portion with a fiber reinforced plastic floor; and
   (b) a superstructure including:
      (1) a front wall including upper, lower and opposite side edges, said front wall being mounted on said frame in proximity to said chassis front end;
      (2) a rear wall including a door opening, upper, lower and opposite side edges, said rear wall being mounted on said frame in proximity to said chassis back end;
      (3) first and second side walls each having upper, lower, front and back edges, each said side wall being mounted on a respective frame side rail at its lower edge;
      (4) mounting means for mounting said walls on said frame;
      (5) a roof including a rim extending downwardly and terminating at a lower edge; and
      (6) mounting means for mounting said roof on said wall upper edges with said roof rim overlapping same.

* * * * *